United States Patent [19]

Ota et al.

[11] Patent Number: 5,305,022
[45] Date of Patent: Apr. 19, 1994

[54] INTERLACED MULTI-BEAM SCANNING TYPE RECORDING APPARATUS

[75] Inventors: Takeshi Ota; Masao Ito, both of Kanagawa, Japan

[73] Assignee: Fuji Xerox Co., Ltd., Tokyo, Japan

[21] Appl. No.: 860,755

[22] Filed: Mar. 24, 1992

[51] Int. Cl.⁵ .............................................. H04N 1/21
[52] U.S. Cl. .................................... 346/108; 358/296
[58] Field of Search .................. 346/108, 76 L, 107 R, 346/160, 1.1; 358/296, 300, 302

[56] References Cited

U.S. PATENT DOCUMENTS

| | | | |
|---|---|---|---|
| 4,989,019 | 1/1991 | Loce et al. | 346/108 |
| 5,233,367 | 8/1993 | Curry | 346/108 |
| 5,241,329 | 8/1993 | Guerin | 346/108 |

FOREIGN PATENT DOCUMENTS

| | | |
|---|---|---|
| 54-7328 | 1/1979 | Japan . |
| 54-38130 | 3/1979 | Japan . |
| 59-15218 | 1/1984 | Japan . |
| 1-45065 | 10/1989 | Japan . |
| 2-39583 | 2/1990 | Japan . |
| 3-248114 | 11/1991 | Japan . |

OTHER PUBLICATIONS

A Study On Laser Scanning Systems Using A Monolithic Arrayed Laser Diode, Minoura et al. SPIE vol. 1079, 1989, pp. 462–474.

Dual Beam Laser Diode Scanning System For Ultrahigh Speed Laser Beam Printers Using A Spot Control Method, Akira Arimoto et al., Applied Optics, vol. 26, No. 13, Jul. 1, 1987, pp. 2554–2557.

Study of Gradation Reproduction In Laser Xerography, T. Tanaka, 6th Conference Of Chromatic Engineering, 1989, pp. 77–80.

Properties Of Closely Spaced Independently Addressable Lasers Fabricated By Impurity-Induced Disordering, Thornton et al., Appl. Phys. Lett. 56(17), Apr. 23, 1990, pp. 1623–1625.

Primary Examiner—Mark J. Reinhart
Attorney, Agent, or Firm—Finnegan, Henderson, Farabow, Garrett & Dunner

[57] ABSTRACT

A semiconductor laser array emits n light beams at intervals r. An optical system having a lateral magnification $\beta$ in the beam arrangement direction forms spots of the n light beams on the photoreceptor. A polygon scanner deflects the n light beams to a direction perpendicular to the beam arrangement direction, to scan the photoreceptor simultaneously with the n light beams. The integer n is selected to be a value not less than 3, and an interlacing period I, which is defined as $I = \beta r/p$ where p is an interval of adjacent scanning lines on the photoreceptor, is selected to be an integer in the range of $2 \leq I \leq (n-1)$ and prime to n.

4 Claims, 8 Drawing Sheets

FIG. 1

SCANNING NUMBERS

○ ⊙ ⊚ —— COMBINATION (n,I) ACCORDING TO INVENTION
( ⊙ —— n:ODD NUMBER, I:2 )
( ⊚ —— n:EVEN NUMBER, I:MINIMUM )
▣ —— COMBINATION (n,I) ACCORDING TO PUBLICATION SHO. 56-110960
△ —— COMBINATION (n,I) NOT INCLUDED IN EITHER CASE

INTERLACED MULTI-BEAM SCANNING TYPE RECORDING APPARATUS

BACKGROUND OF THE INVENTION

The present invention relates to recording apparatuses, such as a digital copier and a laser beam printer, in which an image is written using a light beam. More specifically, the invention relates to a recording apparatus which employs a light source unit having a plurality of light sources, such as a multi-beam semiconductor laser array, and which scans a scanning surface with a plurality of light beams simultaneously to record information.

In a laser beam printer, for example, a laser beam emitted from a semiconductor laser is incident on a rotary multi-face mirror (i.e., polygon scanner), and a beam reflected from the polygon scanner is then incident on a charged surface of a photoreceptor which is moving at a constant speed. The rotation of the polygon scanner causes the laser beam to move in a direction perpendicular to the moving direction of the photoreceptor. Since the laser beam is modulated in accordance with an image to be output, a corresponding electrostatic latent image is formed on the photoreceptor surface. The electrostatic latent image is developed to become a visible toner image.

Such a laser beam printer is required to have a narrow interval of adjacent scanning lines, to provide high-resolution output images. Further, the scanning speed should be sufficiently high to produce images at a high speed. In attaining the high resolution and the high output speed, the most serious problem is a limited rotational speed of the polygon scanner.

To solve this problem, the "multi-beam scanning" has been proposed in which a scanning surface is scanned with a plurality of laser beams simultaneously. In this scanning method, a plurality of laser beam spots should be placed sufficiently close to each other on the scanning surface in a direction (hereinafter called "sub-scanning direction") perpendicular to a scanning direction (hereinafter called "main scanning direction") of the polygon scanner. To this end, various efforts have been made to manufacture a plurality of semiconductor lasers arranged sufficiently close to each other. Semiconductor laser arrays having laser intervals as small as 10 $\mu$m have already been produced experimentally. (For example, refer to Japanese Patent Application Unexamined Publication No. Hei. 2-39583, and R. L. Thornton et al., "Properties of closely spaced independently addressable lasers fabricated by impurity-induced disordering", Appl. Phys. Lett., 56(17), pp. 1623–1625, 1990.)

However, even with a plurality of semiconductor lasers arranged close to each other at intervals as small as 10 $\mu$m, there still exists some gap in the sub-scanning direction, i.e, between adjacent scanning lines. To solve this problem, it has been proposed to eliminate such gaps in the sub-scanning direction by the interlaced scanning (Japanese Patent Application Examined Publication No. Hei. 1-45065, and K. Minoura et al., "A study on laser scanning systems using a monolithic arrayed laser diode", SPIE Vol. 1079, pp. 462–474, 1989). Further, the present assignee has developed a multi-beam scanning optical system in which such gaps are eliminated by interlaced scanning using an array of semiconductor lasers arranged at intervals of 10 $\mu$m (Japanese Patent Application Unexamined Publication No. Hei. 3-248114).

Figure 6:
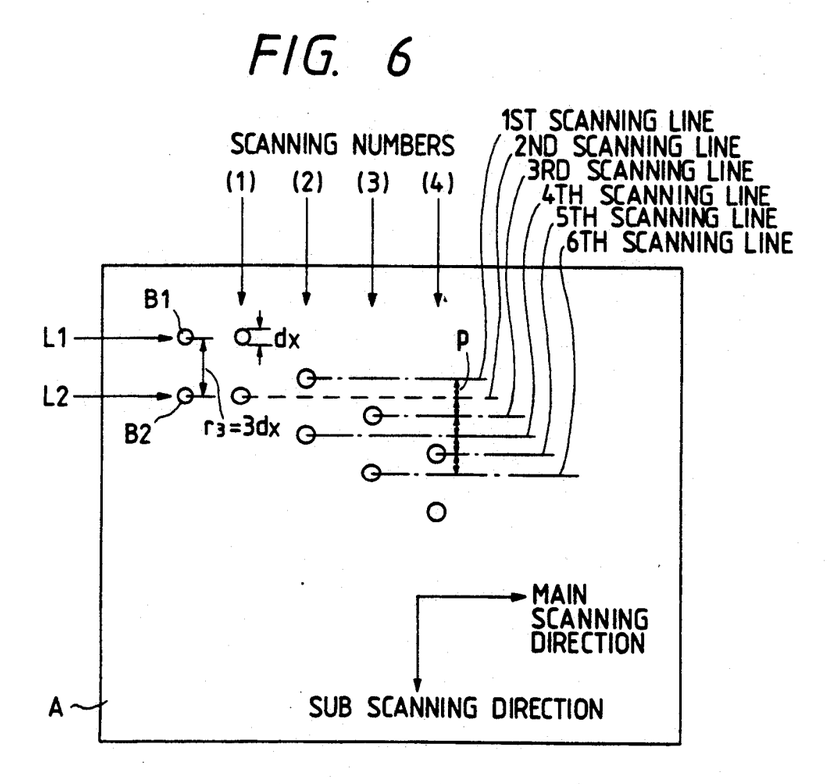
FIG. 6 shows a principle of interlaced scanning and, specifically, a relationship between beam spots and scanning lines on a scanning surface.

FIG. 6 shows an example of the interlaced scanning, which uses two laser beams $L_1$ and $L_2$. In this figure, $d_x$ represents a laser beam spot diameter defined electrophotographically (hereinafter referred to as "electrophotographic spot diameter"). The electrophotographic spot diameter does not mean a diameter of a beam spot itself on a scanning surface A, but a diameter of a spot that appears after development of an electrostatic latent image formed by laser light exposure of the scanning surface A which is a charged photoreceptor. A center-to-center interval $r_3$ between two spots $B_1$ and $B_2$ on the scanning surface A of the respective laser beams $L_1$ and $L_2$ is $3d_x$.

In the example of FIG. 6, sub-scanning of a distance $2d_x$ is performed for each main scanning. The second scanning line is scanned with the laser beam $L_2$ in the first main scanning. Then, in the second main scanning, the first scanning line and the fourth scanning lines are scanned with the laser beams $L_1$ and $L_2$, respectively. Thereafter, the scanning operation is continued in this manner so as to avoid formation of any gaps in the sub-scanning direction. That is, although a gap is formed in certain main scanning, it is scanned in the next scanning, so that no gaps remain after completion of the scanning operation.

In the interlaced scanning, it is required that the following three conditions be satisfied to avoid generation of doubly scanned lines and non-scanned lines.

1) If there exist n laser beams, the sub-scanning distance for each main scanning should be $nd_x$.

2) The interval $r_3$ between the two laser beams on the scanning surface should be an integer multiple of the electrophotographic spot diameter.

3) A scanning line which has already been scanned in certain main scanning should not be scanned in another main scanning.

As is disclosed in the above paper by K. Minoura et al., the third condition is satisfied when following equation (1) holds:

$$p=\beta r/(mn+1) \tag{1}$$

where n represents the number of laser light sources, r the interval of the laser light sources, $\beta$ the lateral magnification in the sub-scanning direction of an image forming optical system, p the scanning pitch, and m an integer not less than zero. If m=0, equation (1) represents the non-interlaced case in which adjacent spots are closely arranged in the sub-scanning direction. It is noted that in the above paper by K. Minoura et al. characters M and $p_0$ are used instead of M and r in equation (1), respectively.

The scanning pitch p, i.e., a minimum interval between scanning lines, is also shown in FIG. 6. In order to perform a scanning operation by a single laser beam without leaving gaps on the scanning surface, it is generally required that the scanning pitch p be equal to the electrophotographic spot diameter $d_2$.

The interval $\beta r$ of the beam spots of the multi-beam laser array is expressed as $\beta r=Ip$, where I is a positive integer and is called "interlacing period".

In general, the spot diameter of a laser beam is defined by a diameter having the two ends where the light amplitude is 1/e ($1/e^2$ in terms of power) of that at the center. The spot diameter according to this definition is called "optical spot diameter" and represented by $d_0$.

Figure 7:
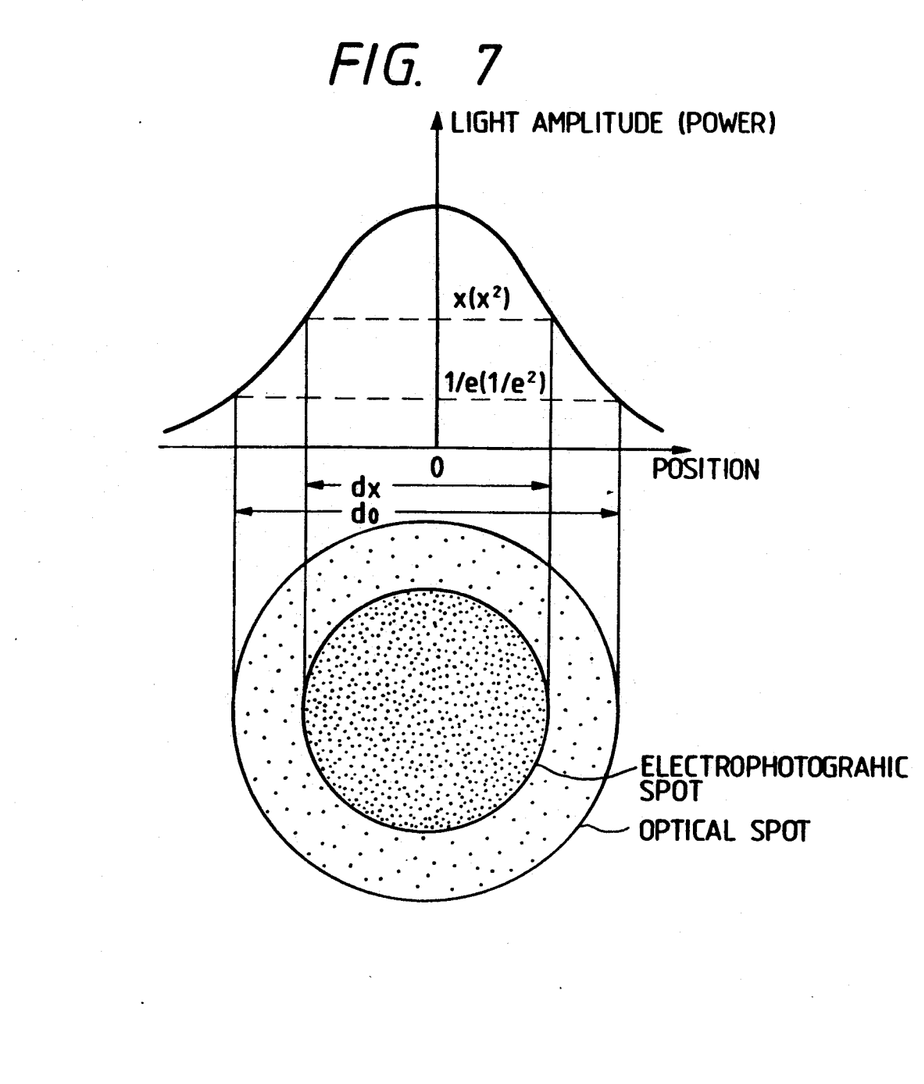
FIG. 7 shows a light amplitude distribution.

FIG. 7 shows a relationship between the optical spot diameter $d_0$ and the electrophotographic spot diameter $d_x$, in which the light intensity on the axis of a laser beam is normalized to 1. A ratio k of the optical spot diameter $d_0$ to the electrophotographic spot diameter $d_x$, i.e., $k=d_0/d_x$, is called "spot diameter correction coefficient". The actual value of k varies depending on the electrophotographic process employed. In the inversion development process, in which toner is stuck to portions exposed to light, it is desirable that k be in the range of 1.4 to 1.6. On the other hand, in the case of the normal development process, in which toner is stuck to portions not exposed to light, it is desirable that k be in the range of 1.5 to 1.8 (T. Tanaka, "Study of Gradation Reproduction in Laser Xerography", 6th Conference of Chromatic Engineering, pp. 77–80, 1989).

Figure 9:
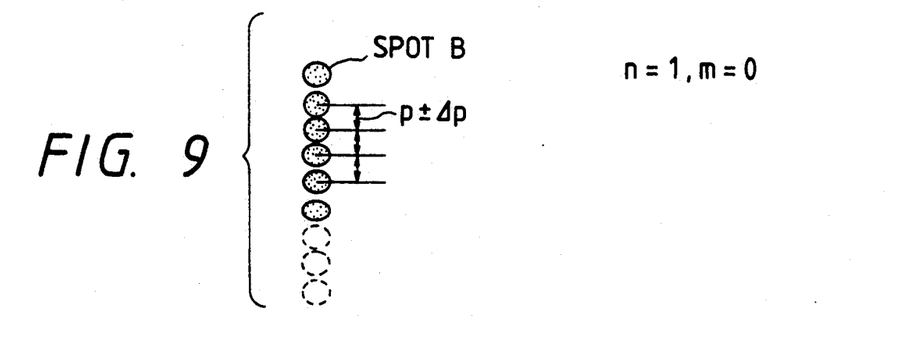
FIG. 9 shows a positional error of spots of scanning with a single light beam.

In the above-described interlaced scanning, it may be conceivable that the interval of the spots formed on the scanning surface can be set as large as desired by properly selecting the integer m. However, practically, if the spot interval is too large, the scanning device is required to have extremely high mechanical accuracy. This is explained below.

Where a scanning surface is scanned by a single light beam as shown in FIG. 9, if it is required that an error of the scanning pitch p between spots B be within a limit $\Delta p$, an allowable error factor $\delta_0$, i.e., a ratio of a sub-scanning speed error $\Delta v$ to a sub-scanning speed v is expressed as:

$$\delta_0 \Delta v/v = \Delta p/p.$$

Figure 10:
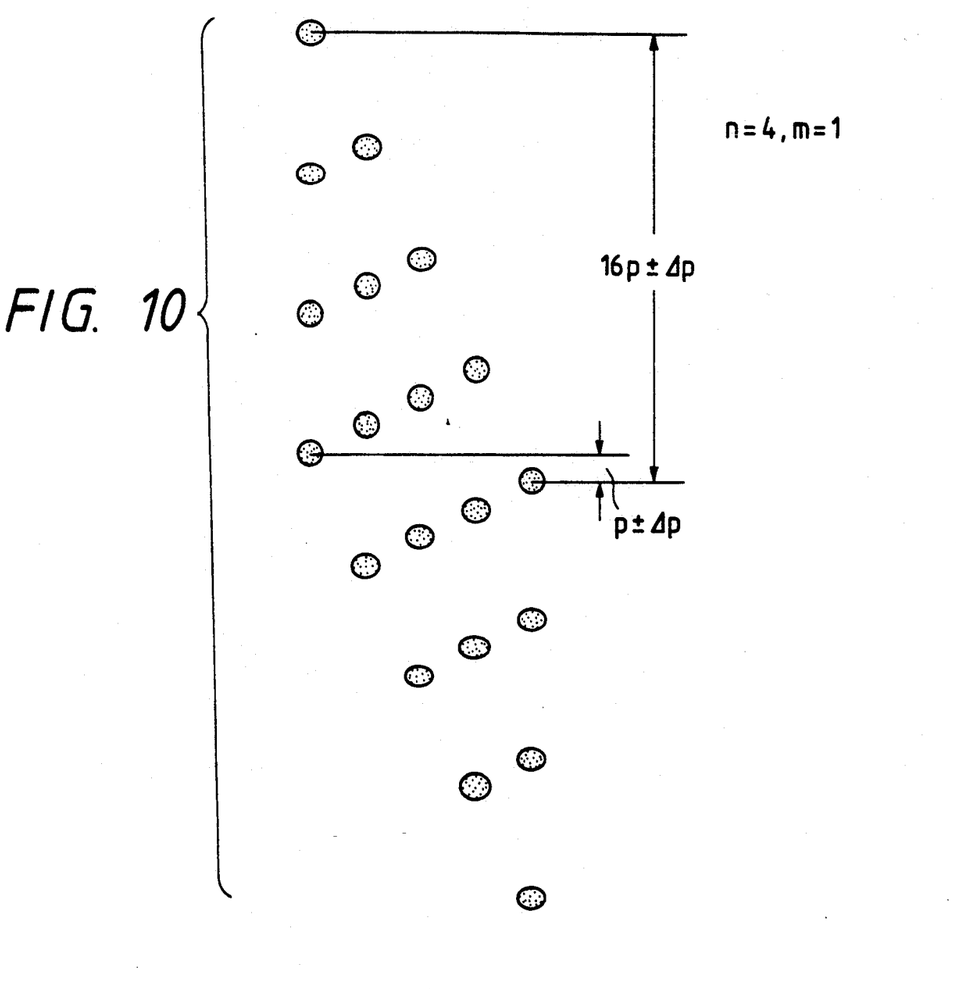
FIG. 10 shows a positional error of spots in the case where n=4 and I=5.

In the case of FIG. 10, in which n=4 and m=1, an allowable error factor $\delta_{4,1}$ is calculated as: $\delta_{4,1}\Delta p/16p=\delta_0/16$. Therefore, the required accuracy is higher than the case of FIG. 9 by more than one order. This tendency becomes more remarkable with increases of the number n of light sources and the integer m.

While the allowable error of the sub-scanning speed is described above, similar problems in connection with accuracy occur in the lateral magnification of the optical system and in the interval between the light sources.

Apparently, it is desirable, to solve the above problems, that the interval between the spots on the scanning surface be as small as possible. In equation (1) described above, the spot interval is smallest when m=0, but this is not an interlaced scanning case. Therefore, we should consider the case of m=1 in equation (1), which will provide the smallest spot interval among the interlaced scanning cases. When m=1, the interval $\beta r$ between the adjacent spots on the scanning surface is expressed as (n+1)p and increases with the number n of the light sources.

Considering the above, the allowable error factor $\delta_{n,m}$ for the number n of the light sources and the integer m has the following relationship:

$$\delta_{n,m} \geq \delta_{n,1}\delta_0/n^2. \quad (2)$$

Figure 8:
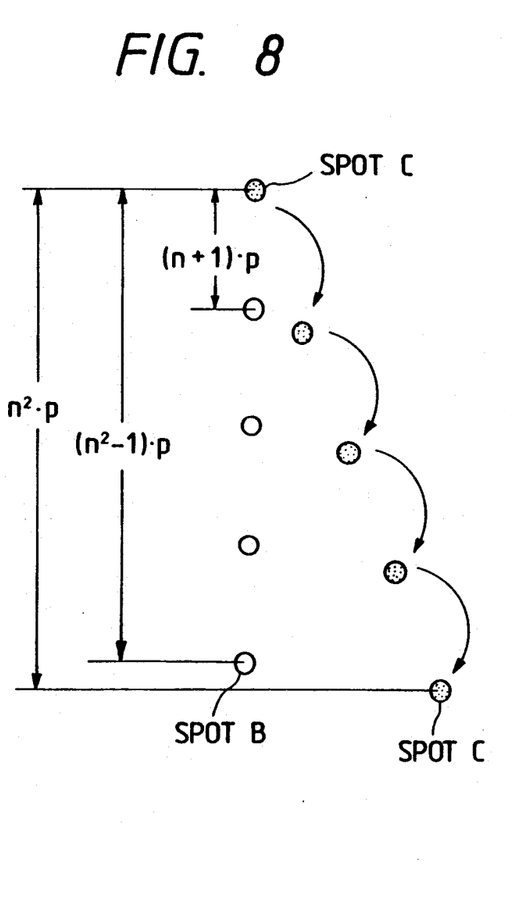
FIG. 8 shows the arrangement of spots of conventional interlaced scanning.

This is schematically illustrated in FIG. 8. When m=1, since each spot interval is (n+1)p, the two most distant spots have an interval of $(n_2-1)p$. A last spot B of the first scanning should be adjacent, in the sub-scanning direction, to a head spot C of the n-th scanning.

Another problem arises when it is intended to expand the spot interval on the scanning surface. That is, in performing a plural times of scanning to scan the area between the two scanning lines of the adjacent beams, capacity of high-speed memories necessary for electrically controlling the interlaced scanning is increased with the number of lines to be skipped.

SUMMARY OF THE INVENTION

The present invention has been made in consideration of the above problems of the prior art and, therefore, an object of the invention is to provide a recording apparatus which can reduce an interval of beam spots on a scanning surface, relax the accuracy required for a scanning optical system, and provide, with a scanning optical system simpler than conventional ones, interlaced scanning having higher performance.

According to the invention, there is provided a recording apparatus comprising a light source unit having n light sources capable of being driven independently and arranged at an interval r, for emitting n light beams; a photosensitive medium; an optical system having a lateral magnification $\beta$ in an arrangement direction of the n light sources, for forming spots of the n light beams on a surface of the photosensitive medium; and a deflector for deflecting the n light beams to a direction substantially perpendicular to the arrangement direction of the n light sources, to scan the surface of the photosensitive medium simultaneously with the n light beams, wherein:

said n is selected to be an integer not less than 3; and an interlacing period I, which is defined as:

$$I=\beta r/p \quad (3)$$

where p is an interval of adjacent scanning lines on the surface of the photosensitive medium, is selected to be an integer in a range of $2 \leq I \leq (n-1)$ and prime to said n.

In particular, in the case where n is an odd number, if I is selected to be 2, the beam spot interval can remain the same for any value of n, contributing to simplification of a manufacturing process.

Further, in the case where n is an even number, it is preferable that I be a minimum natural number prime to n. For example, if n=4, I is preferably selected to be 3. If n=6, I is preferably selected to be 5.

DESCRIPTION OF THE PREFERRED EMBODIMENT

Before describing a preferred embodiment of the present invention, a basic principle of the invention is explained below.

If the number n of the light sources and the interlacing order I are prime to each other, interlaced scanning is possible, even for such a case that the interval between the light sources is smaller than the value r defined by equation (1).

Figure 1:
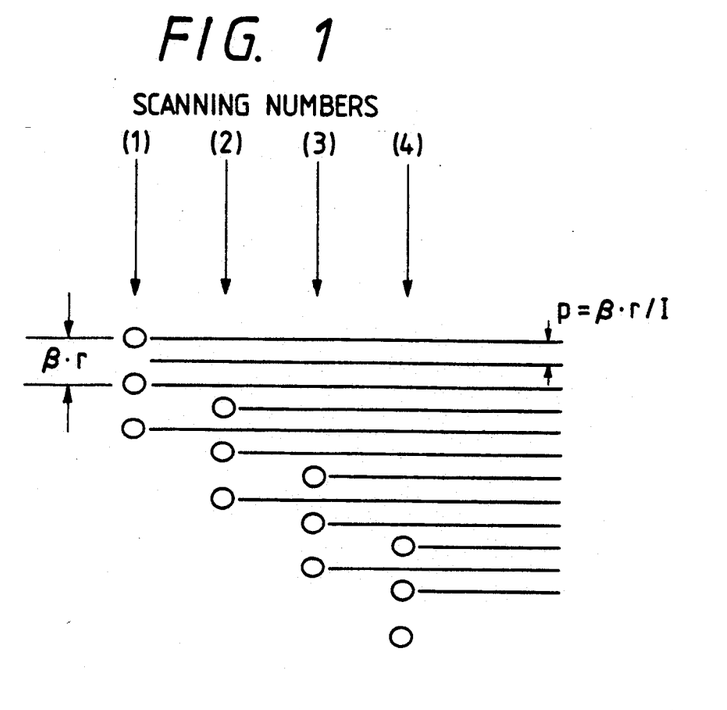
FIG. 1 schematically shows a beam spot interval $\beta r$, the number n of beam spots and an interlacing period I in a recording apparatus according to the present invention.

Rearranging equation (3), we obtain:

$$\beta r = Ip \qquad (4)$$

where I and n are integers prime to each other and I is in the range of $2 \leq I \leq (n-1)$. This relationship is illustrated in FIG. 1. In the following, there are made discussion as to characteristics of various cases in which the interlaced scanning is possible, by comparing equations (1) and (4).

For example, if the number n of the light sources is 4, the minimum value of the spot interval $\beta r$ ($=(mn+1)p$) which satisfies equation (1) is 5p. On the other hand, according to equation (4), since the minimum value of the interlacing period I which is prime to n (=4) is 3, $\beta r$ becomes equal to 3p.

If n is 5, the minimum value of $\beta r$ which satisfies equation (1) is 6p. On the other hand, according to equation (4), since the minimum value of I which is prime to n (=5) is 2, $\beta r$ is equal to 2p, which is one third of $\beta r$ according to equation (1).

According to the recording apparatus having the above construction, the interlacing period I can be made smaller than the number n of the light sources in the case where n is not less than 3. This contributes to the reduction of the accuracy of the sub-scanning position or speed. The allowable error factor $Y_{n,I}$ of the sub-scanning position or speed satisfies the following formula:

$$\gamma_{n,I} \geq \delta_0/I(n-1) \qquad (5)$$

Since $I \leq (n-1)$, formula (5) is rewritten as:

$$\gamma_{n,I} \geq \delta_0/(n-1)^2 \qquad (6)$$

If formula (2) of the conventional method and formula (6) of the invention, both describing the allowable error, are compared for the same number n considering $\delta_0/(n-1)^2 \geq \delta_0/n^2$, one can find that $\gamma_{n,I}$ always larger than or equal to $\delta_{n,m}$. Therefore, according to the invention, the accuracy required for the sub-scanning position or speed is always lower than the conventional method. Further, the capacity of high-speed memories for controlling the interlaced scanning operation can be reduced.

Figure 12:
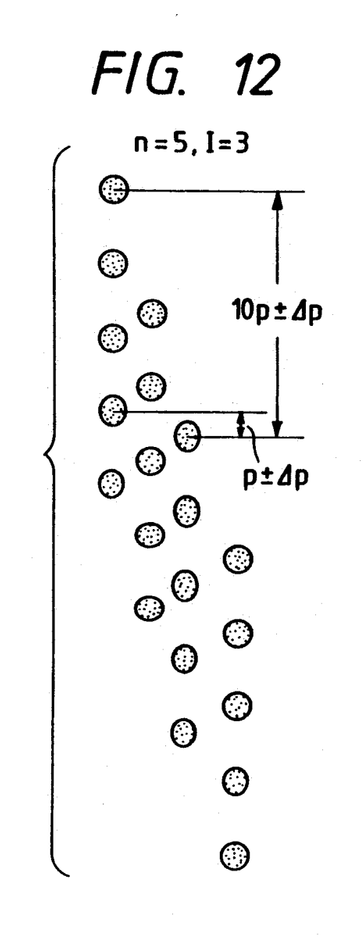
FIG. 12 shows an allowable error of a sub-scanning position or speed in the case where n=5 and I=3.
Figure 13:
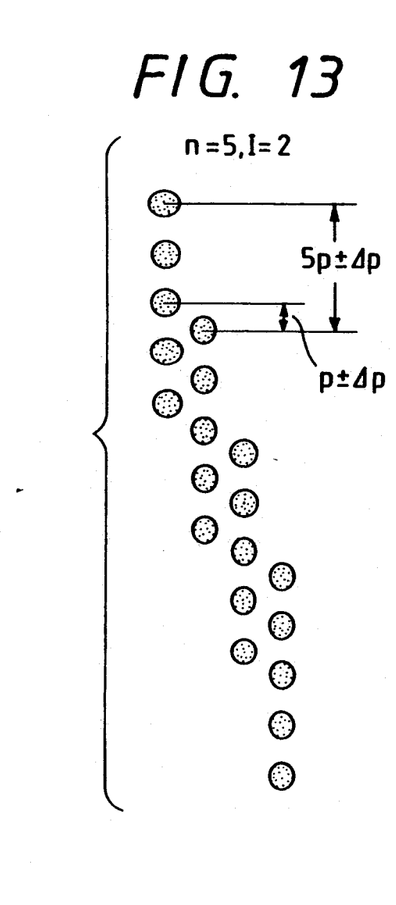
FIG. 13 shows an allowable error of the sub-scanning position or speed in the case where n=5 and I=2.
Figure 14:
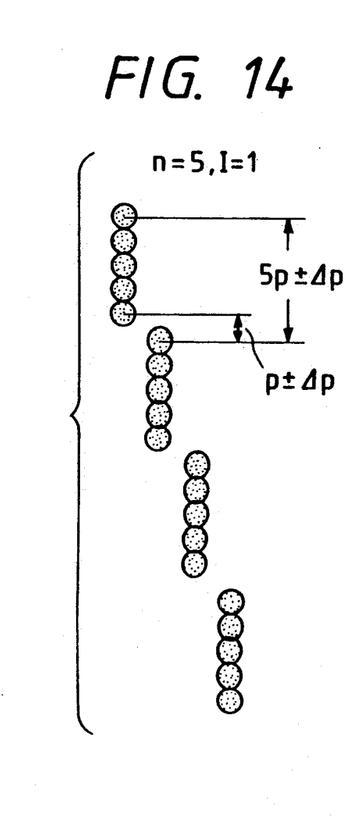
FIG. 14 shows an allowable error of the sub-scanning position or speed in the case where n=5 and I=1.

In particular, if the number n is selected to be an odd number not less than 3, the interlaced scanning of the interlacing period I=2, which is the smallest value theoretically conceivable, can be realized. In this case, the accuracy required for the sub-scanning direction or speed is particularly small among the cases according to the invention. For example, as shown in FIG. 12, if n=5 and I=3, $\gamma_{5,3}$ is equal to $\delta_0/10$. On the other hand, if I=2, $\gamma_{5,2}$ is equal to $\delta_0/5$, requiring a half degree of mechanical accuracy. As can be understood from the comparison between FIGS. 13 and 14, the mechanical accuracy required for the case of I=2 is the same as that for the non-interlaced scanning. Further, the capacity of memories for controlling the interlaced scanning can be particularly small among the cases according to the invention. The interval of the light sources can remain the same for any number n of the light sources.

In the case where n is an even number not less than 4, if I is selected to be a minimum natural number prime to n, the interlaced scanning having the smallest value of I among values theoretically conceivable when n is an even number can be realized. As a result, the accuracy required for the sub-scanning position or speed can be particularly small. The capacity of high-speed memories for controlling the interlaced scanning can be reduced.

Figure 15:
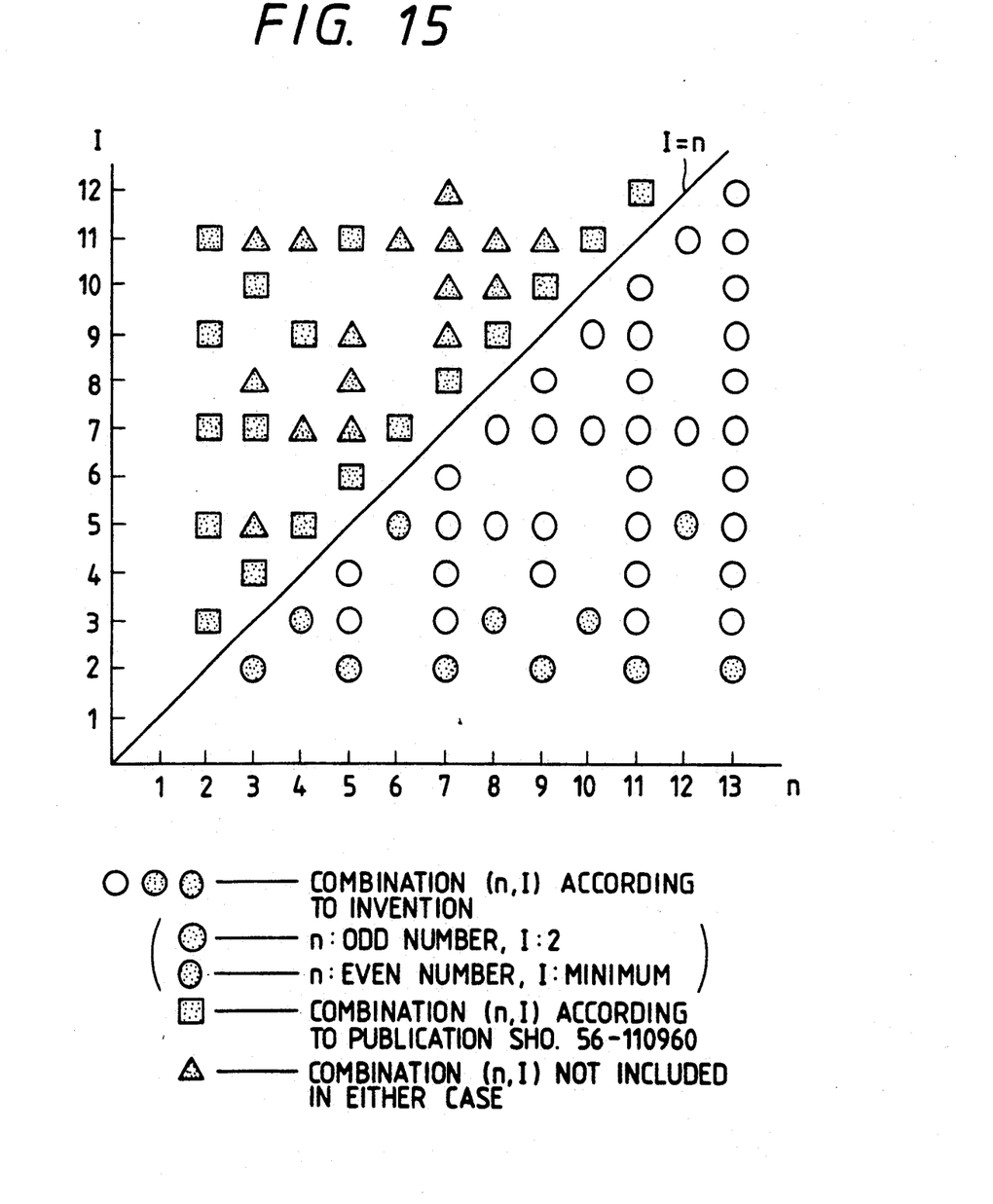
FIG. 15 is a graph showing combinations of n and I of the cases capable of interlaced scanning.

Table 1 shows a comparison as to the allowable error of the sub-scanning position or speed between the present invention and a conventional example (specifically, the above paper by K. Minoura et al.), for n's of 3-8. FIG. 15 is a graph showing combinations of n and I of the cases capable of interlaced scanning.

TABLE 1

| | Invention | | Conventional (m = 1) | |
|---|---|---|---|---|
| n | I | $Y_{n,I}/\delta_o$ | $n + 1 = \beta r/p$ | $\delta_{n,m}/\delta_o$ |
| 3 | 2 | ½ | 4 | 1/9 |
| 4 | 3 | ⅙ | 5 | 1/16 |
| 5 | 2 | 1/5 | 6 | 1/25 |
|   | 3 | 1/10 | | |
|   | 4 | 1/15 | | |
| 6 | 5 | 1/20 | 7 | 1/36 |
| 7 | 2 | 1/7 | 8 | 1/49 |
|   | 3 | 1/14 | | |
|   | 4 | 1/21 | | |
|   | 5 | 1/21 | | |
|   | 6 | 1/35 | | |
| 8 | 3 | 1/16 | 9 | 1/64 |
|   | 5 | 1/24 | | |
|   | 7 | 1/48 | | |

An embodiment of the invention is described hereinafter with reference to the accompanying drawings. Specifically, there is described an example for implementing a laser beam printer having a resolution of 800 spi (spots/inch) using a multi-beam semiconductor array, with a main description directed to the design of its optical system.

Figure 2:
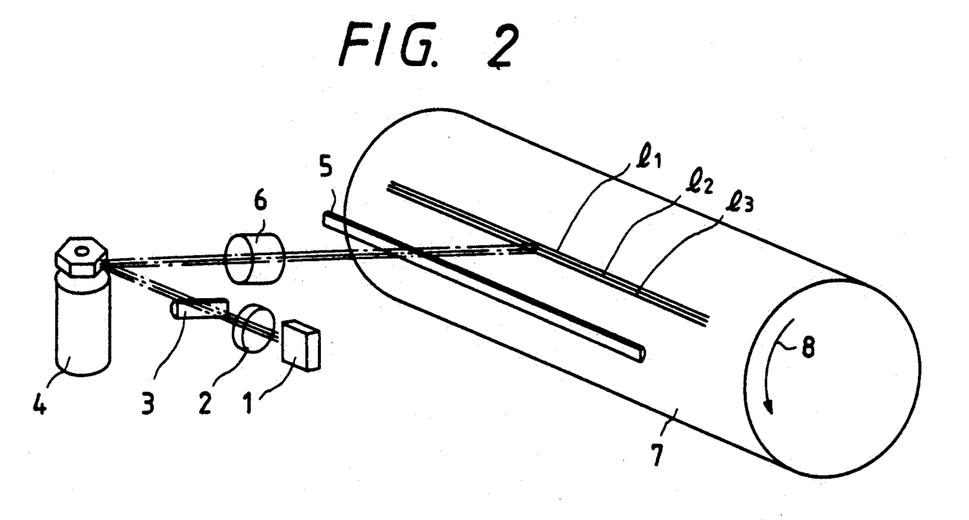
FIG. 2 is a perspective view showing a general configuration of an optical system of a laser beam printer according to an embodiment of the invention.

FIG. 2 schematically shows a scanning optical system of the embodiment. Three laser beams emitted from a multi-beam semiconductor laser array 1 pass through a collimator 2 and a cylindrical lens 3, and are deflected by a polygon scanner 4 to scan a photoreceptor 7. The deflected laser beams form spots on the photoreceptor 7 after passing through a cylindrical lens 5 and an image-forming lens (i.e., an f-θ lens) 6. The photoreceptor 7 rotates in the direction as indicated by reference numeral 8. Movement of the photoreceptor 7 caused by this rotation is called sub-scanning. The cylindrical lenses 3 and 5 are disposed to correct for a face inclination of the polygon scanner 4, and constitute an anamorphic optical system. An optical image drawn on the photoreceptor 7 is developed and visualized by an electrophotographic process (not shown).

Figure 3:
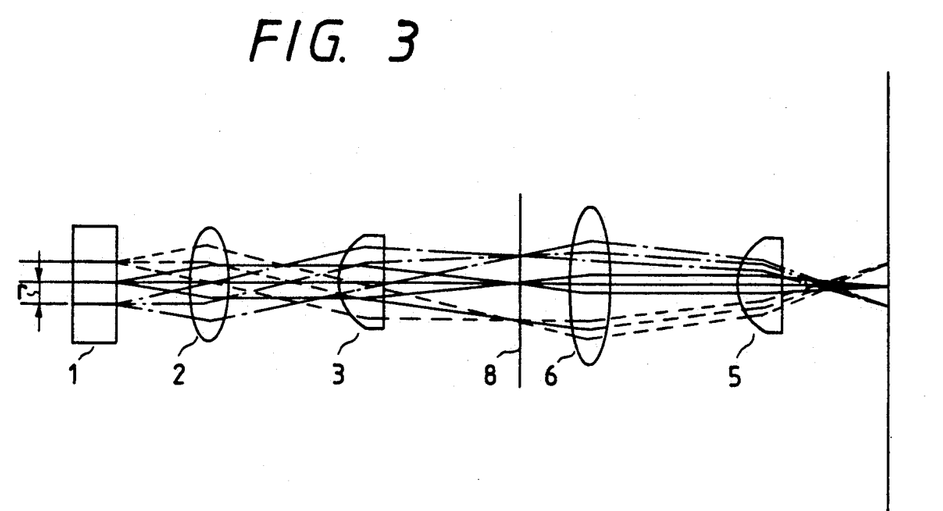
FIG. 3 is a development of FIG. 2 taken by a plane perpendicular to a deflection plane and including the optical axis.

FIG. 3 is a development of the optical system of FIG. 2, taken by a plane perpendicular to the deflection plane and including the optical axis.

Figure 4:
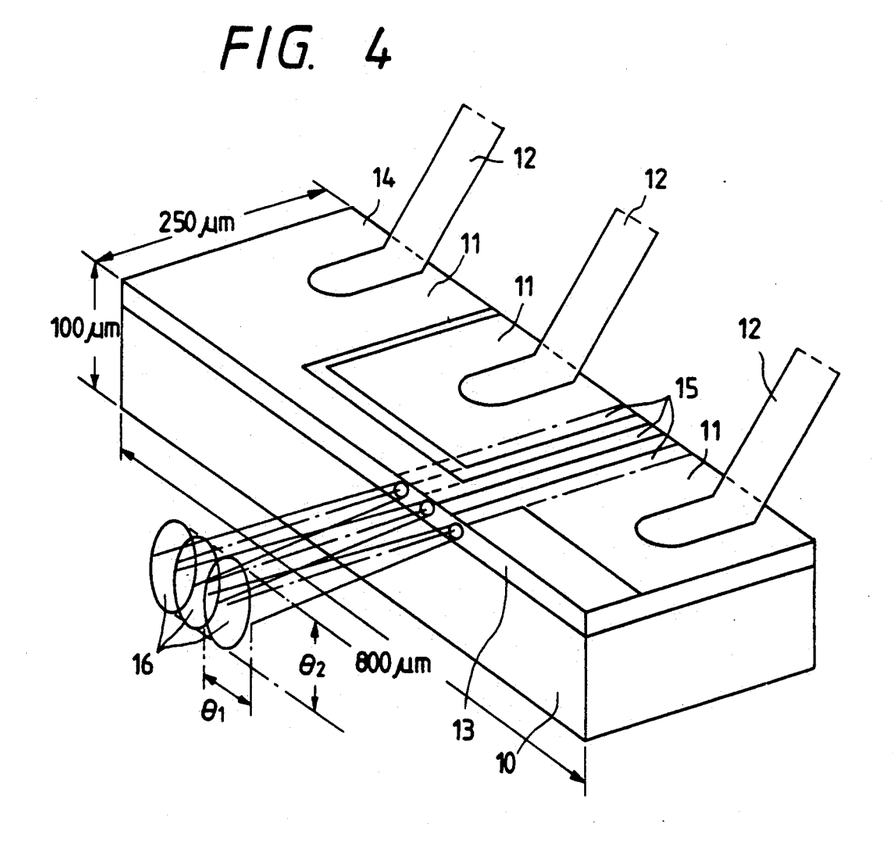
FIG. 4 is a perspective view showing a multi-beam semiconductor laser array.
Figure 11:
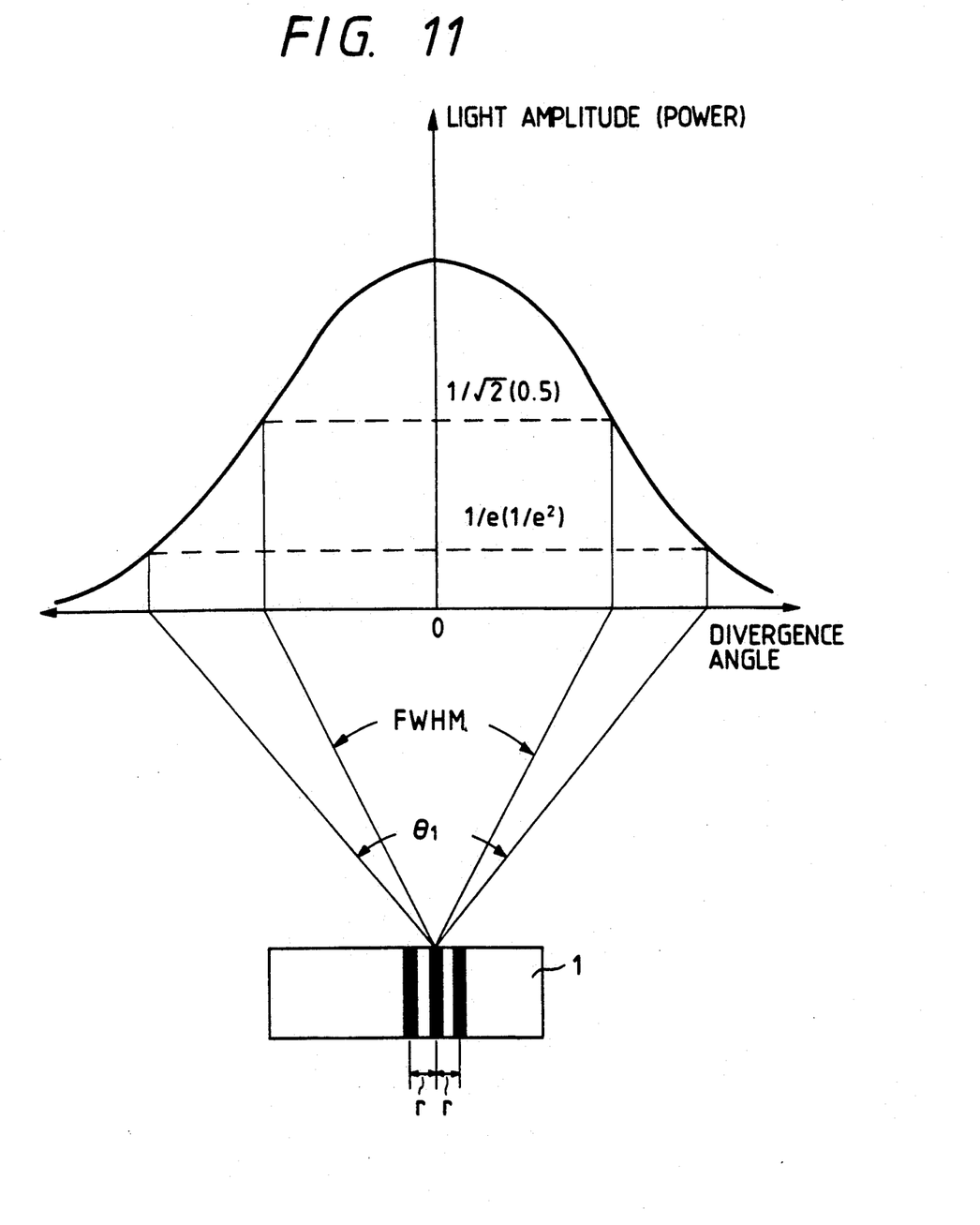
FIG. 11 shows how amplitude of laser light emitted from the semiconductor laser array depends on its divergence angle.

FIG. 4 is a perspective view showing a configuration of the multi-beam semiconductor laser array 1 shown in FIGS. 2 and 3. In FIG. 4, reference numeral 10 represents a substrate; 11, a bonding pad; 12, a boding wire; 13, a front facet with an AR (anti-reflection) coating; 14, a rear facet with a HR (high-reflection) coating; and 15, a stripe of a laser diode. A divergence angle $\theta_1$ of the laser beams 16 in the direction in parallel with the junction surface of the semiconductor laser array 1 is 12°. As shown in FIG. 11, the divergence angle is defined as an angle at which power is $1/e_2$ of that on the optical axis. It is noted that in some other cases the divergence angle may be defined in a different manner, i.e., by the full width at half maximum (FWHM), which is an angle at which power is a half of that on the optical axis. Further, the semiconductor laser array 1 emit light having a wavelength $\gamma$ of 0.78 µm.

Figure 5:
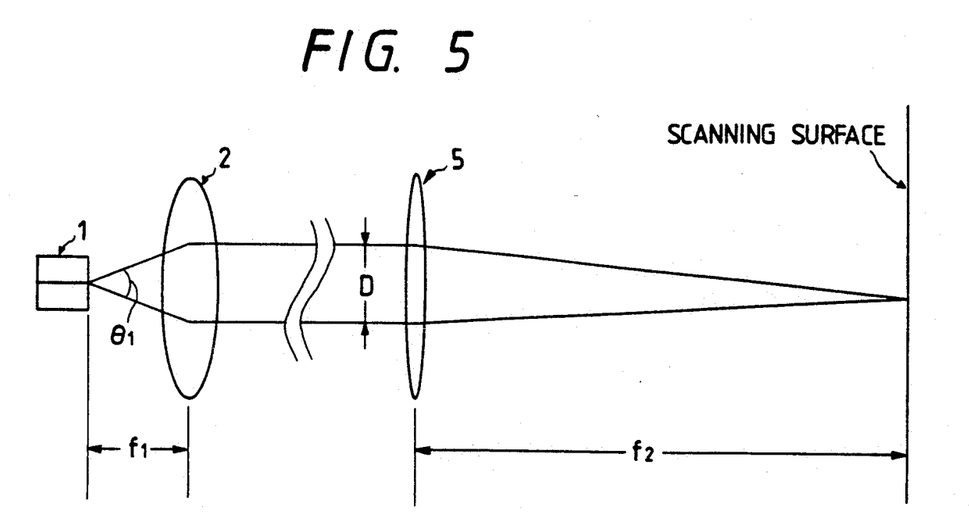
FIG. 5 schematically shows parameters of the optical system of FIG. 2.

Referring to FIG. 5, a diameter $d_0$ in the sub-scanning direction of a laser beam spot formed on the scanning surface is expressed as:

$$d_0 = 4f_2\lambda/\pi D$$

where D represents a diameter of a laser beam incident on the image-forming lens 5, $f_2$ a focal length in the sub-scanning direction of the image-forming lens 5, and $\pi$ the circular constant. The beam diameter D is calculated as:

$$D = 2f \sin(\theta_{\frac{1}{2}})$$

where $f_1$ is a focal length of the collimator 2.

Therefore, if a lateral magnification $\beta$ in the sub-scanning direction of the image-forming optical system is given by $f_2/f_1$, the diameter $d_0$ in the sub-scanning direction of the laser beam spot on the scanning surface is finally written as follows:

$$d_0 = 2\lambda\beta/\pi \sin(\theta_1/2).$$

The diameter $d_0$ is the optical spot diameter as described above, and is different from a spot diameter of an image finally formed. The spot diameter in the sub-scanning direction of an image finally formed by an electrophotographic process, i.e., the electrophotographic spot diameter $d_x$ is expressed as:

$$d_x = d_0/k = 2\lambda\beta/\pi k \sin(\theta_1/2).$$

Since an interval between the adjacent semiconductor laser elements of the multi-beam semiconductor laser array 1 is r, an interval $r_j$ of the adjacent spots formed on the scanning surface is given by:

$$r_j = \beta r.$$

The quotient of $r_j$ divided by $d_x$ should be equal to the interlacing period I, that is, $I = r_j/d_x$.

Therefore, the interval r between the adjacent semiconductor laser elements of the multi-beam semiconductor laser array 1 is finally expressed as follows:

$$r = 2\lambda I/\pi k \sin(\theta_1/2). \qquad (7)$$

Substituting $\lambda = 0.78$ µm, $\theta_1 = 12°$ and $I = 2$ into equation (7), we obtain $r = 7.0$ µm. As is already described above, the interval r can remain the same irrespective of the number n of the beams as long as n is an odd number. Therefore, r can take the value of 7.0 µm for both the cases of $n = 5$ and $n = 7$. This means that a manufacturing process of the semiconductor laser array 1 can be the same for the cases where n is an odd number.

In order to implement a laser beam printer having a resolution of 800 spi, the spot diameter $d_x$ should be 31.75 µm ($=25.4$ mm/800). Therefore, if $I = 2$, $r_j$ should be 63.5 µm, and the lateral magnification of the optical system is calculated as 9.1.

While the above embodiment is directed to the laser beam printer manufactured on an electrophotographic process, it is apparent that the present invention can be applied to recording apparatuses based on other processes. For example, the invention can be applied to a recording apparatus in which an ordinary photosensitive film is scanned instead of the electrophotographic photoreceptor, to a thermographic apparatus in which an image is drawn utilizing a heating effect of laser light, and a magnetooptical recording apparatus. In these apparatuses, however, it should be noted that the optimum value of the ratio k in equation (7) is not always identical to that of the apparatus based on the electrophotographic process. Therefore, it is necessary to determine the interval of the laser light sources experimentally for a recording process actually used.

The above description is made with an assumption that the electrophotographic spot diameter $d_x$ should be equal to the scanning pitch p to expose the entire area of the photoreceptor without causing any gaps. However, since the invention is intended to provide a recording apparatus which can scan, with the pitch p, the entire area (i.e., all the lines) of the scanning surface except the start and end portions, the invention can also be applied to an apparatus which performs interlaced scanning of the entire area (all the lines) of the scanning surface except the start and end portions with some gaps.

As described in the foregoing, the recording apparatus of the invention, which performs interlaced multi-beam scanning, does not require high accuracy in the sub-scanning mechanics, the magnification of the optical system and the dimensions of the multi-beam semiconductor laser array, which would be required in conventional apparatuses. Therefore, the invention easily realizes high-resolution, high-speed recording. Further, the number of high-speed memories for controlling the interlaced scanning can be reduced. If it is determined that the number of the laser beams should be selected from odd numbers, a manufacturing process of the semiconductor laser array can commonly be used for a plurality of types.

What is claimed is:

1. A recording apparatus comprising a light source unit having n light sources capable of being driven independently and arranged at an interval r, for emitting n light beams; a photosensitive medium; an optical system having a lateral magnification $\beta$ in an arrangement direction of the n light sources, for forming spots of the n light beams on a surface of the photosensitive medium; and a deflector for deflecting the n light beams to a direction substantially perpendicular to the arrangement direction of the n light sources, to scan the surface of the photosensitive medium simultaneously with the n light beams, wherein:

said n is selected to be an integer not less than 3; and an interlacing period I, which is defined as $I=\beta r/p$ where p is an interval of adjacent scanning lines on the surface of the photosensitive medium, is selected to be an integer in a range of $2 \leq I \leq (n-1)$ and prime to said n.

2. The recording apparatus of claim 1, wherein said n is selected to be an odd number, and said I is selected to be 2.

3. The recording apparatus of claim 2, wherein said n is selected to be 3.

4. The recording apparatus of claim 1, wherein said n is selected to be an even number, and said I is selected to be a minimum natural number prime to said n.

* * * * *